(12) United States Patent
Periyasamy et al.

(10) Patent No.: US 12,554,480 B2
(45) Date of Patent: Feb. 17, 2026

(54) SYSTEM AND METHOD FOR INTEGRATION APPLICATION ENVIRONMENT MIGRATION UTILIZING HUB AND SPOKE ARCHITECTURE

(71) Applicant: HEXAWARE TECHNOLOGIES LIMITED, Navi Mumbai (IN)

(72) Inventors: Sasikumar Periyasamy, Salem (IN); Sekar Marimuthu, Chennai (IN); Ezhilan Santhanam, Aldie, VA (US)

(73) Assignee: HEXAWARE TECHNOLOGIES LIMITED, Navi Mumbai (IN)

( * ) Notice: Subject to any disclaimer, the term of this patent is extended or adjusted under 35 U.S.C. 154(b) by 263 days.

(21) Appl. No.: 18/420,394

(22) Filed: Jan. 23, 2024

(65) Prior Publication Data

US 2024/0248703 A1 Jul. 25, 2024

(30) Foreign Application Priority Data

Jan. 23, 2023 (IN) .............................. 202321004478

(51) Int. Cl.
*G06F 8/61* (2018.01)
*G06F 8/34* (2018.01)
(Continued)

(52) U.S. Cl.
CPC . *G06F 8/65* (2013.01); *G06F 8/34* (2013.01)

(58) Field of Classification Search
CPC ..... G06F 8/65; G06F 8/34; G06F 8/20; G06F 8/76; G06F 8/427; G06F 16/35; G06F 9/48; G06F 9/45; G06F 9/44; G06Q 10/087
See application file for complete search history.

(56) References Cited

U.S. PATENT DOCUMENTS 11,385,882 B2 * 7/2022 Pal .................. G06F 9/4856
12,099,871 B2 * 9/2024 Pal .................. G06F 9/4843

OTHER PUBLICATIONS

Chen et al., A character social network relationship map tool to facilitate digital humanities research, 28 pages (Year: 2020).*

* cited by examiner

*Primary Examiner* — Thuy Dao
(74) *Attorney, Agent, or Firm* — MUNCY, GEISSLER, OLDS & LOWE, P.C.

(57) ABSTRACT

The present subject matter discloses a system and a method for integration application environment migration utilizing hub and spoke architecture. In one implementation, the method for application environment migration including assessing at least one source application code of corresponding integration application environment by a processor (122) of an integration application server. The processor forecasts an assessment statistic (302) that provides at least one functional readiness (304) and a timeline (306) to complete the migration of the each source application code. The processor (122) further scans the each source application code of corresponding source application for generating the integration applications compatible with a target application environment and creates a relationship map to match components of the integrating applications with components of the target application environment. The processor (122) generates a re-factored code for the each source application code by breaking the each source application code into macro-services (426a, . . . , 426n) and repackaging the macro-services (426a, . . . , 426n) in accordance with the target application code. Thereby, updating components of the integration application environment as per the forecasted assessment statistic (302) and the re-factored code and thus migrating the integration application environment to the target application environment while re-platforming the (Continued)

updated components and the re-factored code of the integration application environment to the target application environment.

20 Claims, 6 Drawing Sheets

(51) Int. Cl.
*G06F 8/65* (2018.01)
*G06F 8/71* (2018.01)
*G06F 9/455* (2018.01)
*G06F 9/48* (2006.01)
*G06F 9/50* (2006.01)
*H04L 29/08* (2006.01)

SYSTEM AND METHOD FOR INTEGRATION APPLICATION ENVIRONMENT MIGRATION UTILIZING HUB AND SPOKE ARCHITECTURE

FIELD OF THE INVENTION

The present disclosure generally relates to the field of computers, more specifically the present disclosure relates to a system and method for integration application environment migration utilizing hub and spoke architecture to allow integration applications for automatically migrating from an older environment to a newer and faster environment without the cumbersome hassle and time being taken by users, while maintaining structural soundness and quality standards.

BACKGROUND OF THE INVENTION

With the advent of technologies, a large number of computing services are being provided to users or customers by cloud-based datacenters that enable leased access to computing resources at various levels. As generally understood, datacenters often provide individuals and organizations with a range of solutions for systems deployment and operation. Enterprise Application Integration (EAI) platform has been widely used in the industry, and has achieved initial results in solving business integration problems relating to migration of applications. Conventionally, individual vendors often provide migration technologies for a specific target cloud environment for limited types of applications. In such a case, there is a high probability that few vendor migration technologies work well for certain components in an application, but not for all components therein. Migrating an application using such migration technologies may result in costly and lengthy remediation processes typically performed by professional services.

Alternatively, applications were migrated onto newer environments by completely reproducing the application in accordance with the newer environment which was time-taking and did not provide much benefit of the already existing application. With quicker environment updates, there has been inadequate time to update applications manually since by the time an application gets migrated to a newer environment, a newer one would be released. Further, migrating applications to different environments also came with its own unique challenges including but not limited to assuring the logic does not get lost during transformation, and that the migration corresponds to the older and newer environments. However, the current EAI platform is equipped with integration process having a large workload which is often prone to errors. Moreover, current platforms have not evolved to provide a uniform platform across technologies and tiers or to supporting the end-to-end life cycle of service compositions.

Cloud adoption has become mainstream with enterprises leveraging Cloud as a key part of their IT strategy. This is evident from the year on year growth of leading cloud providers like AWS, Azure and GCP over the last couple of years. As a first phase these enterprises have successfully adopted cloud by developing new applications on cloud using cloud native design principle. Having realized success with that, enterprises are now looking for ways to migrate the rest of their important applications on cloud to realize broad benefits of cloud. The challenge however is migrating existing applications to cloud poses a different set of issues, for example what is the right cloud migration approach, balancing of risk, cost and timeline to complete the cloud migration, complexity of existing applications especially old applications without an SME, maximize total cost of ownership (TCO) savings and increase productivity for future releases, execution speed, enhanced performance, and the like.

In this view, when a customer decides to move its data and/or applications from one platform to another (e.g., from one datacenter to another), the process is usually relatively cumbersome due to lack of methods to formalize, normalize, and communicate computing requirements across clouds. Due to the complex parameters and effort required in migrating integration applications, along with the crunch in time with regular updates, there exists a need to develop a system and method for implementing hub and spoke architecture which migrates integration applications from one environment to another without or minimally requiring manual assistance while addressing the variety of issues associated with application, and its components.

SUMMARY OF THE INVENTION

This summary is provided to introduce concepts related to systems and methods for application environment migration and the concepts are further described below in the detailed description. This summary is neither intended to identify essential features of the claimed subject matter nor is it intended for use in determining or limiting the scope of the claimed subject matter.

In one implementation, a method for integration application environment migration is disclosed. The method comprising assessing, by a processor of an integration application server, at least one source application code of corresponding integration application environment and analyzing, by a processor of an integration application server and forecasting, by the processor, an assessment statistic, wherein the assessment statistic provides at least one functional readiness and a timeline to complete the migration of the each source application code. The method further comprising scanning, by the processor, the each source application code of corresponding source applications for generating the integration applications compatible with a target application environment and creating, by the processor a relationship map to match components of the integrating applications with components of the target application environment. The method further comprising generating, by the processor, at last one re-factored code for the each source application code, wherein the re-factored code is generated by breaking the source application code into macro-services and repackaging the macro-services in accordance with corresponding target application code. The method furthermore comprising updating, by the processor, updating, by the processor, components of the each integration application environment as per the forecasted assessment statistic and the each re-factored code and thereby migrating, by the processor, the each integration application environment to the target application environment, wherein the migration ensures automatic re-platforms the updated components and the re-factored code of the integration application environment to the target application environment.

In yet another implementation, the method has the a quantum change for migrating each source application code to the corresponding target application code, wherein the quantum change is calculated on the basis of the size and complexity of the integration application environment.

In yet another implementation, the method has at least one re-factored code is generated utilizing a continuous integration and deployment framework and an automated test framework.

In yet another implementation, the method has the assessment statistic provides at least one inhibitor to complete the migration of the each source application code.

In yet another implementation, the method scans the source application code that includes scanning links between components of the each source application code.

In yet another implementation, the method has repackaging the macro-services in accordance with the target application code is completed while retaining links between components of the integration application environment.

In yet another implementation, the method has the macro-services identified by an AI Engine.

In another implementation, the method comprises, migrating, by the processor, deployment architecture, component configurations, structure of the integration application from the integration application environment in accordance with the target application environment.

In another implementation, the method comprises, implementing, by the processor, security rules from the integration application environment in accordance with the target application environment.

In another implementation, the method comprises, packaging and building, by the processor, each service into a separate container by generating an application program interface proxy utilizing a gateway and a continuous integration and continuous deployment framework.

In another implementation, the method comprises, accessing, by the processor, a plurality of storage units comprising a business logic, links, rule engines, libraries of available environments, standard tools, and coding languages.

In yet another implementation, the method has the integration application environment migrates to the target application environment comprising the steps of: an integration source to target environment re-development, an integration source to target application re-factoring, an integration source to target application re-hosting, and an integration source to target application re-platforming.

In one implementation, a system for integration application environment migration is disclosed. The system comprises a processor and a memory coupled to the processor, wherein the processor executes a plurality of modules stored in the memory. The plurality of modules further comprises an assessment module, for assessing at least one source application code of corresponding integration application environment and the assessment module forecasts wherein the assessment statistic provides at least one functional readiness and a timeline to complete the migration of the each source application code. The plurality of modules further comprises a re-factor module for scanning the each source application code of corresponding source applications and creating a relationship map to match components of the integrating applications with components of the target application environment. The re-factor module generates the integration applications compatible with a target application environment and generating at last one re-factored code for the each source application code, wherein the re-factored code is generated by breaking the source application code into macro-services and repackaging the macro-services in accordance with corresponding target application code. The plurality of modules further comprises a re-platform module, for updating components of the each integration application environment as per the forecasted assessment statistic and the each re-factored code and migrating the each source application environment to the target application environment, wherein the migration ensures automatic re-platforms the updated components and the re-factored code of the integration application environment to the target application environment.

In yet another implementation, the system has a quantum change for migrating each source application code to the corresponding target application code, wherein the quantum change is calculated on the basis of the size and complexity of the integration application environment.

In yet another implementation, the system has the assessment statistic provides at least one inhibitor to complete the migration of the each source application code.

In yet another implementation, the system scans the source application code that includes scanning links between components of the source application code.

In yet another implementation, the system has repackaging the macro-services in accordance with the target application code is completed while retaining links between components of the integration application environment.

In yet another implementation, the system has the macro-services identified by an AI Engine.

In another implementation, the system comprises the re-factor module further comprising: migrating, by the processor, deployment architecture, component configurations, structure of the integration application from the integration application environment in accordance with the target application environment.

In another implementation, the system comprises the re-platform module that implements re-security rules from the integration application environment in accordance with the target application environment.

In another implementation, the system comprises the re-factor module that packages and builds each service into a separate container by generating an application program interface proxy utilizing a gateway and a continuous integration and continuous deployment framework.

In another implementation, the system comprises the plurality of modules that executes a plurality of storage units comprising a business logic, links, rule engines, libraries of available environments, standard tools, and coding languages.

In yet another implementation, the system has the integration application environment migrate migrates to the target application environment comprising the steps of: an integration source to target environment re-development, an integration source to target application re-factoring, an integration source to target application re-hosting, and an integration source to target application re-platforming.

It is the primary object of the subject matter to provide a system and method for integration application environment migration that may be used to migrate integration applications from one platform to another and more specifically, it may be used to migrate the integration applications from an older environment to a newer environment. The system and method for application environment migration may be customized based on the application to be migrated as well as the environments including the older environment the application is developed in and the newer environment to which the application has to be migrated.

It is another object of the subject matter to provide an integration application environment migration that caters to a number of applications while retaining their business logic. In one case, the system and method for integration application environment migration may be able to migrate the integration applications to be migrated from a wide range of environments to another wide range of environments.

It is another object of the subject matter to provide a system and method for integration environment migration that migrates an integration application environment in an automated manner without the requirement of manual inputs.

It is another object of the subject matter to provide an integration application environment migration that reduces the time and effort taken by development teams to migrate integration applications from an older environment to a newer environment, by eliminating the repeatable patterns of work done by the development team, thereby also reducing costs.

It is another object of the subject matter to provide an application environment migration that can be utilized by development teams to migrate integration applications from an older environment to a newer environment.

It is another object of the subject matter to provide an integration application environment migration that behaves like a parser which studies an existing chunk of code, analyses it, processes it and thereafter repackages it.

It is another object of the subject matter to provide an integration application environment migration that can be utilized for migrating integration applications from an older environment like distinct web applications coded in JAVA or .NET, to a newer environment like the cloud interface.

It is another object of the subject matter to provide an application environment migration that migrates integration applications from an older environment to a newer one by reducing implementation costs, reducing total cost of ownership thereby increasing profitability, increasing the execution speed, enhancing the application's performance and enhancing the application's productivity.

It is another object of the subject matter to provide a number of advantages depending on the particular aspect, embodiment, implementation and/or configuration.

It is another object of the subject matter to provide a platform that can provide reliable execution, scalability, and value-added services, while controlling operating effort and costs.

It is another object of the subject matter to efficiently manage numerous instances simultaneously, work in different regulatory requirements, enable resources to collaborate and work together closely, efficiently and collectively with user friendly interfaces.

These and other implementations, embodiments, processes and features of the subject matter will become more fully apparent when the following detailed description is read with the accompanying experimental details. However, both the foregoing summary of the subject matter and the following detailed description of it represent one potential implementation or embodiment and are not restrictive of the present disclosure or other alternate implementations or embodiments of the subject matter.

BRIEF DESCRIPTION OF THE DRAWINGS

A clear understanding of the key features of the subject matter summarized above may be had by reference to the appended drawings, which illustrate the method and system of the subject matter, although it will be understood that such drawings depict preferred embodiments of the subject matter and, therefore, are not to be considered as limiting its scope with regard to other embodiments which the subject matter is capable of contemplating. Accordingly.

DETAILED DESCRIPTION OF THE INVENTION

Figure 1:
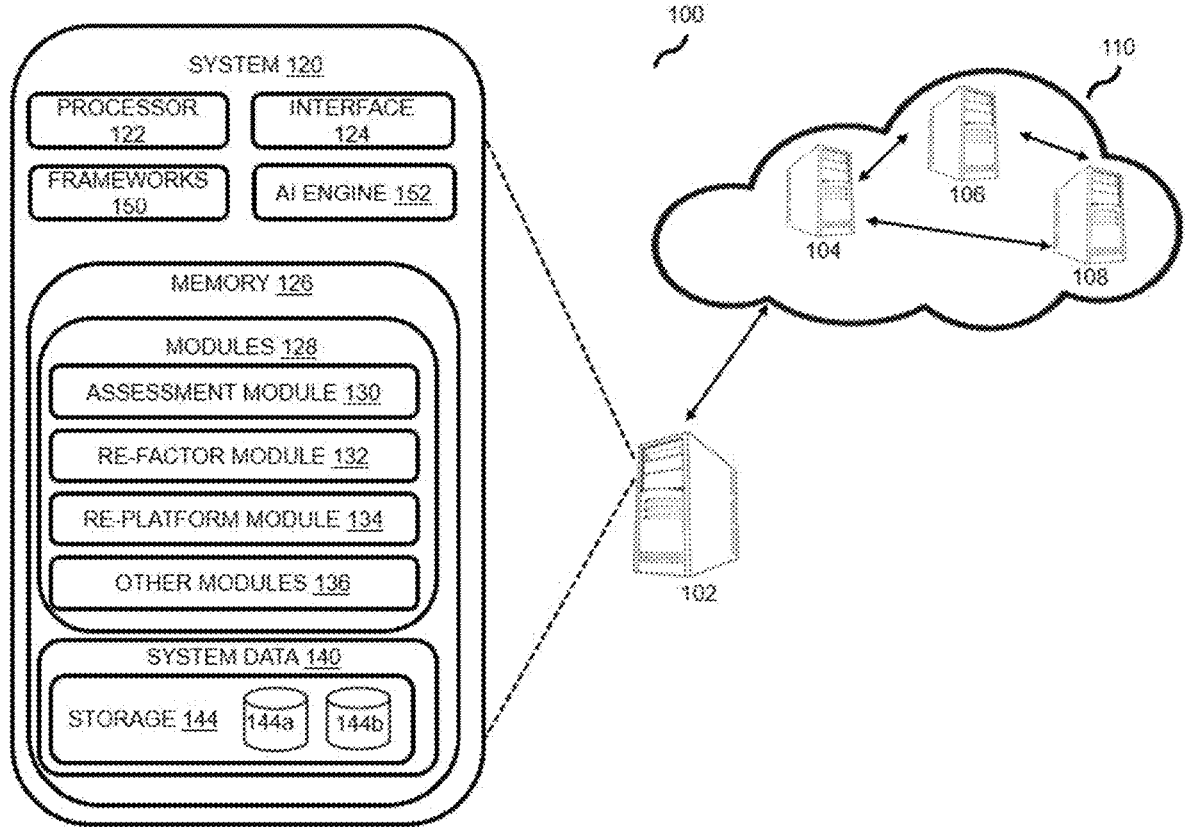
FIG. 1 illustrates a schematic module diagram depicting a method of integration application environment migration, in accordance with an embodiment of the present subject matter.

The following is a detailed description of implementations of the present disclosure depicted in the accompanying drawings. The implementations are in such detail as to clearly communicate the disclosure. However, the amount of detail offered is not intended to limit the implementations but it is to cover all modifications, equivalents, and alternatives falling within the spirit and scope of the present disclosure. While aspects of described systems and methods for integration application environment migration can be implemented in any number of different computing systems, environments, and/or configurations, the embodiments are described in the context of the following exemplary system (s).

The present disclosure provides a cloud-based integration service that re-platforms an integration application from a source application environment to a target application environment. The cloud re-platform of applications involves migrating existing on-premise integration applications and corresponding multiple application components to cloud to make the integration application environment work efficiently by taking advantage of scalability and elastic features of cloud. The integration platform may correspond to an ideal platform such as an Enterprise Application Integration (EAI) Platform for supporting multiple applications or systems using the hub and spoke configuration. In other words, the integration platform acts as hub of the integration point to multiple applications or systems (acting as spoke). The integration application environment structure will also be modified to reduce a total cost of ownership (TCO) of these applications which involve adopting more open source and cloud friendly software to remove a licensing cost for virtual machines, integration application servers and databases. Actual TCO reduction will vary from application to application and determined after application assessment. The present disclosure lists a few important steps to be performed in applications, although they may vary from application to application, to modify existing application to work effectively on Cloud Platform or PaaS, all blocker related to source and on-premise design patterns will be changed, all underlying libraries will be upgraded to make the application compatible with container or PaaS, integration application servers (Weblogic, WebSphere, JBoss, . . . ) and databases may be replaced with open source cloud friendly software, the one or more applications may be de-coupled into smaller macro services for efficiency and velocity. Components are hosted in the container which supports scalable and available application logic. For an instance, components such as adapters become native middleware platform components, thereby enabling these components to be used for supporting integration workload scenarios.

The present disclosure provides a mechanism for cloud re-platforming by simple containerization involving removing all code blockers that impede containerization and deploying integration applications in a container like Docker to make it work on Cloud using the hub and spoke configuration. Further, the integration application release process will also be automated which involves test case and Continuous Integration/Continuous Deployment (CI/CD) automation. Still further, the integration applications and/or the source database may also be re-platformed to a lightweight open source server like Tomcat for JAVA applications to reduce the TCO of these applications by eliminating the license cost and reducing the compute cost on cloud. However, to guarantee stability and performance the one or more applications will have to be broken down to smaller services, make all of these applications stateless and deploy them into separate Tomcat servers with each deployed in a separate container. Thus, the integration applications will be migrated to a target application platform by decoupling the one or more applications and exposing it through APIs by using macro-services concepts to make it cloud ready. Along with breaking a one or more applications into macro-services, CI/CD will also be implemented to achieve the fast and automated deployment. A component wise structure and a step wise method is listed below.

By way of illustration, consider an example use case involving cloud migration of one or more integration applications. As part of the cloud migration of an existing application, a need may exist to upgrade one or more integration application servers and software. Such operations can involve, for example, upgrading many integrations across multiple environments with multiple Spring Batch integrations. At least one embodiment, in connection with such an example use case, can include migrating all of the relevant application code written in versions of Java, Spring, and/or Spring Boot, which might include one or more challenges. Such challenges would be identified, remediated, deployed, and revalidated from the integration application environment to different environments (and potentially across various business units) via such an embodiment.

FIG. 1 illustrates a schematic module diagram 100 depicting a method of integration application environment migration, in accordance with an embodiment of the present subject matter.

In one implementation, an integration application environment migration system 120 implements a method for integration application environment migration on a server 102 utilizing hub and spoke architecture, the system 120 includes a processor(s) 122, interface(s) 124, framework(s) 150, an AI Engine 152, and a memory 126 coupled or in communication to the processor(s) 122. The processor(s) 122 may be implemented as one or more microprocessors, microcomputers, microcontrollers, digital signal processors, central processing units, state machines, logic circuitries, and/or any devices that manipulate signals based on application environment migration instructions. Among other capabilities, the processor(s) 122 is configured to fetch and execute computer-readable instructions stored in the memory 126. The framework 150 includes but not limited to a continuous integration and continuous deployment framework, an automated test framework, and the like. The AI Engine 152 including but not limited to a database (DB) re-platform engine, an app re-platform engine, a batch and scheduler re-platform engine, a message broker re-platform engine, an open source AI engine, and the like.

Although the present disclosure is explained by considering a scenario that the system is implemented as an application on a server, the systems and methods can be implemented in a variety of computing systems. The computing systems that can implement the described method(s) include, but are not restricted to, mainframe computers, workstations, personal computers, desktop computers, minicomputers, servers, multiprocessor systems, laptops, tablets, SCADA systems, smartphones, mobile computing devices and the like.

The interface(s) 124 may include a variety of software and hardware interfaces, for example, a web interface, a graphical user interface, etc., allowing the system 120 to interact with a user. Further, the interface(s) 124 may enable the system 120 to communicate with other computing devices, such as web servers and external data servers (not shown in FIG). The interface(s) 124 can facilitate multiple communications within a wide variety of networks and protocol types, including wired networks, for example LAN, cable, etc., and wireless networks such as WLAN, cellular, or satellite. The interface(s) 124 may include one or more ports for connecting a number of devices to each other or to another server.

A network used for communicating between all elements in an integration application server and cloud environment may be a wireless network, a wired network or a combination thereof. The network can be implemented as one of the different types of networks, such as intranet, local area network LAN, wide area network WAN, the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices. The network further has access to storage devices residing at a client site computer, a host site server or computer, over the cloud, or a combination thereof and the like. The storage has one or many local and remote computer storage media, including one or many memory storage devices, databases, and the like.

The memory 126 can include any computer-readable medium known in the art including, for example, volatile memory (e.g., RAM), and/or non-volatile memory (e.g., EPROM, flash memory, etc.). In one embodiment, the memory 126 includes module(s) 128 and system data 140. The modules 128 further includes an assessment module 130, a re-factor module 132, a re-platform module 134, and other modules 136 including but not limited to a blocker assessment module, a script generator module and the like. The script generator module further including but not limited to a test case generator, a build script generator, a docker script generator, a pipeline script generator, a deployment script generator, and the like. It will be appreciated that such modules may be represented as a single module or a combination of different modules. Furthermore, the memory 126 further includes system data 140 that serves, amongst other things, as a repository for storing data fetched, processed, received and generated by one or more of the modules 128. The system data 140 includes, for example, operational data, workflow data, and other data at a storage 144. The system data 140 has the storage 144, represented by 144*a*, 144*b*, . . . , 144*n*, as the case may be. In one embodiment, the system data 140 has access to the other databases over a web or cloud network. The storage 144 includes multiple databases including but not limited to an assessment module data, a re-factor module data, a re-platform module data, libraries, link identifiers, a database adapter, a database dictionary, a database parser, a technology dictionary, a file adapter, an application parser, a pattern recognizer, open source libraries, technology stack, and the like. It will be appreciated that such databases may be represented as a single database or a combination of different databases. In one embodiment data may be stored in the memory 126 in the form of data structures. Additionally, the aforementioned data can be organized using data models, such as relational or hierarchical data models.

The server 102 is further connected or connectable or a part of a cloud environment 110 that has a plurality of computing systems including but not limited to a target application environment server 104, and an another target application environment server 106, and databases including but not limited to a database 108. It is imperative that the computing systems and databases communicate with each other under cloud computing rules and also with the server 102 under the web or other available communication mediums/protocols. The computing systems of the target integration application server 104, 106 generally are distributed processing systems including multiple computing devices connected by and communicating over a network. Software applications may be run "in the cloud" by configuring them to execute across one or more of the computing devices in a particular cloud computing environment/system. The computing devices of a cloud computing system may each execute separate copies of the software application, or, in some cases, the operations of the software application may be split among different computing devices and executed in parallel. A cloud computing system may include a plurality of cloud computing instances representing resources available for executing applications. Each instance may be a physical computing device having particular capabilities (storage size, processing speed, network bandwidth, etc.), or may be a virtual computing device having particular capabilities. A particular cloud computing system may offer different instance types having different sets of capabilities for executing software applications.

In one implementation, at first, a user including but not limited to a migration professional, a database administrator, an application developer, a quality analyst or a test professional may use a user access device to access the system 120 via the interface 124 using the server 102. The working of the system 120 and related method and associated modules, sub modules, methods may be explained in detail also using FIG. 2, FIG. 3, FIG. 4, FIG. 5, and FIG. 6 explained below.

In one embodiment, the system 120 receives a user instruction data through the interface 124 on the server 102. The modules 128 of the system 120 processes the instructions using the processor 122 while using the system data 140, the other modules 136, the frameworks 150 and supporting components. The assessment module 130 for integration application environment migration is utilized before initiating the migration of an application from one environment to another. The assessment module 130 analyses data pertaining to each integration application from the at least one source application code within the integration application environment. In one case, the data may correspond to complete architecture, inventory and component details of the integration applications. Further, the assessment module 130 performs an assessment of an integration application environment to ascertain an in-depth understanding of a quantum change the integration application environment will have to undergo while assessing the risk, costs, timeline as well as the impact the change would make to other dependent applications to migrate to a target application environment. The assessment module 130 understands the underlying application source code developed by various developers having a variety of coding styles. Furthermore, a forecasted assessment report 302 generated by the assessment module 130 using the AI engine 152 provides in-depth details regarding but not limited to a timeline required, a percentage of code that needs to be changed, a plurality of readiness parameters, a plurality of inhibitors or code blockers and warnings along with the reason, highlighted portions where code needs to be modified, number of services a one or more applications can be broken into, the kind of services the one or more applications may be broken into and the readiness of the application for continuous integration and continuous deployment. The assessment report 302 generated by the assessment module 130 provides an accurate estimate and timeline to complete the migration of the integration application environment. In one embodiment, an Robotic Process Automation (RPA) bot is configured to generate an assessment report 302 using a proactive application environment migration forecasting (PAEMF) algorithm. In one embodiment, the RPA bot is a software bot or a combination of a software and hardware bot. In an embodiment, the software bot is a computer program enabling a processor to perform robotic process automation by utilizing AI. In another embodiment, the bot has a combination of hardware and software, where the hardware includes memory, processor, controller and other associated chipsets especially dedicated to perform functions that enable robotic process automation for application environment migration.

The re-factor module 132 scans the each source application code of corresponding source applications for generating the integration applications compatible with a target application environment. Thereafter, the re-factor module 132 create a relationship map to match components of the integrating applications with components of the target application environment. Furthermore, re-factor module 132 supports the automated re-platforming for the integration application environment migration to the target application environment migration by converting the pre-existing code of the one or more web application and generate a re-factored code which corresponds to the target application environment without changing business logic(s). The re-factored code is generated by breaking the each source application code into macro-services and repackaging the macro-services in accordance with a target application code while retaining the business logic. The re-factor module 132 generates the re-factored code for the integration application environment utilizing the continuous integration and deployment framework 150, the automated test framework 150, and middleware re-platform and environment-friendly design patterns.

The re-platform module 134 for integration application environment migration supports the automated re-platforming for the integration application environment migration to the target application environment to transform an integration application from one environment to another on the basis of the size of the application as well as its complexity by performing activities including but not limited to upgrading underlying libraries, de-coupling the front-end and back-end from the one or more applications, breaking the back-end into several services in accordance to the new environment, packaging and building each service into a separate container, generating the application program interface proxy utilizing a gateway, generating a continuous integration and deployment framework 150, and the like. The re-platform module 134 updates the supporting components of the integration application environment as per a forecasted assessment statistic of the assessment report 302 and the re-factored code and thereby migrating the integration application environment to the target application environment by re-platforming the updated supporting components and the re-factored code of the integration application environment to the target application environment. The re-platform module 134 also performs activities including but not limited to integrating patterns of the integration application environment with design patterns of the target application environment, fine-tuning the code, resolving deployment issues, implementing security in order to ascertain the migrated application to be fully functional, and the like. The re-platform module 134 assists in multiple forms of environment migration including but not limited to a re-hosting environment migration, an application re-platforming, an application re-factoring and a native environment development, and the like.

The blocker assessment module of the other modules 136, any application like a one or more web application having on-premise design patterns may be inputted in the system and method for application environment migration wherein the blocker assessment module of the system and method for application environment migration may discover patterns in the on-premise design patterns of the one or more web applications. Furthermore, this information may be transferred to the automated re-platforming module of the system and method for integration application environment migration as per FIG. 1.

The reference architecture of the system 120 further has the supporting components, such as, test generator—test generator generates the test case for unit, functional and performance test cases for generated API. Build Script Generator-build script generator generates the scripts to successfully build and run the application. Docker Script Generator-Docker script generator generates the scripts to containerize the integration applications and its dependencies. Pipeline Script Generator-pipeline script generator generates the scripts to create the CI/CD pipeline for dev, test and prod environments. Deployment Script Generator-deployment script generator generates the scripts to deploy the applications to the target environment. Database Adapter-database adapter utility establishes the connectivity to multiple database servers such as IBM DB2, Oracle, Microsoft SQL Server, Sybase ASE and postgresql. Database Dictionary-database dictionary contains vast database related keywords and built-in functions used by the multiple database servers mentioned above. Database Parser-database parser parses the database objects by using the database dictionary to find the patterns which are not compatible with the target database. AI Engine—AI engine identifies the existing and potential macro/micro services in the legacy application. DB Re-platform Engine—DB re-platform engine re-platforms the source database objects such as tables, constraints, sequences, triggers, functions procedures etc. To the target database compatible objects. File Adapter—file adapter provides access to the source files of the application. The files are scanned to prepare the report and eventually re-platformed as the target application. Technology Dictionary—technology dictionary contains vast technology related patterns used inside the integration applications. Application Parser—application parser parses each application of the each application source code with the help of pattern recognizer to find out the whole inventory of the technologies the application is using. This inventory is used for the assessment and re-platforming. Pattern Recognizer—pattern recognizer recognizes the pattern based on the technology dictionary to find the technologies used in the integration applications. App Re-platform Engine—App re-platform engine re-platforms the source application which was parsed by the application parser. This engine generates the application which is ready to be deployed to the cloud. Technology Stack including but not limited to JAVA 1.8; Maven; junit, nunit, xunit jmeter; Docker Jenkins; AWS CLI, Azure CLI, and the like.

Figure 2:
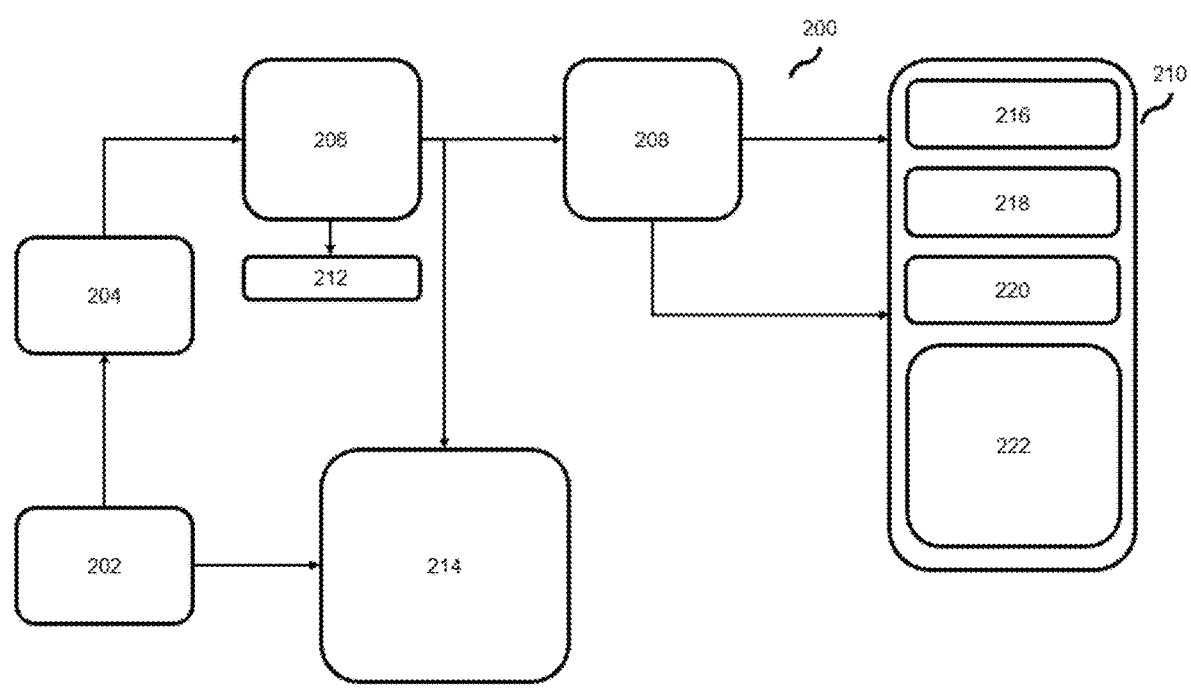
FIG. 2 illustrates a system diagram describing the working of an exemplary integration application environment migration system, in accordance with an embodiment of the present subject matter.

FIG. 2 illustrates a system diagram 200 describing the working of an exemplary integration application environment migration system, in accordance with an embodiment of the present subject matter.

The present disclosure depicts two important activities which are integration application environment assessment and corresponding source application code transformation to the desired target platform. These two activities are explained below in the flowchart 200.

In one embodiment, the one or more web application 202, such as a JAVA application, a ORACLE application, and a .NET application, is an integration application of an integration application environment. In one case, the one or more source applications may form the integration application. Further, the one or more web application 202 is linked to various supporting components 204, including but not limited to, databases, batch, integration, App, scheduler, message broker, and the like.

In a first step, a cloud blocker assessment 206 assess the integration applications and generates an assessment report 212 comprising code impediments, source code insights, and on-premise design patterns 214. The on-premise design patterns 214 further including, but not limited to EJB, RMI, STRUTS/SPRING, SOAP/XML, JSP/ASP, COM/COM++, ESB, and the like. The assessment of the integration applications involve technology stack of the current applications and code analysis. The assessment provides automated insights into the time, effort and risk involved in re-platforming the integration application. The assessment starts with a code analysis, where it performs an automated assessment of the source application static code and identifies the inhibitors or blockers (Packages/Frameworks/API/Libraries etc.) which will fail the containerized cloud migration of the application and readiness parameters and thereby provides the detailed assessment report 212 further detailed as the assessment report 302. It performs this code assessment for entire integration application ecosystem including applications, databases, batch programs and schedulers, integration message brokers, build and deployment modules. The cloud blocker assessment 206 gets an in depth understanding of the quantum of changes the source environment will have to go through to assess the risk, cost, timeline and the impact to other dependent components and applications. The report primarily provides percentage of code that needs to be changed, code readiness, blockers and warnings along with the reason, exact places where the code needs to be modified, number of services into which the one or more applications can be broken down, DevOps and CI/CD readiness, and a timeline for such execution.

In the next step, an automated transformation/re-platforming 208 for application and supporting components re-platforming from an integration environment to a target environment is performed to generate a cloud ready application and supporting components 210, such as a JAVA application or a .NET application, an Oracle database or a DB2 database comprising of a continuous integration and deployment framework 216, an automated test framework 218, a middle ware re-platform 220, and cloud friendly design patterns 222 after re-factoring a source code of the integration application environment while retaining a business logic of the source application in the target application. The sub-steps in automated re-platforming 208 is to upgrade underlying libraries and other supporting components, de-couple front-end and back-end from the one or more applications, break down the back-end into several macro services, package and build each macro service into a separate container, rest of the activities like integrating web-front with macro services, fine tuning the code, resolving deployment issues and, implementing security would be completed by the consultants to make the application fully functional. In one example, the application environment transformation further includes generating API proxy using Zuul, generating test framework for APIs, generating CI/CD framework. In one example, Table A and Table B may be used as an example to illustrate an exemplary code transformation.

TABLE A

Exemplary code transformation features

| S. No. | Source Technology | Target Technology |
|---|---|---|
| 1 | Session EJB | Spring Boot |
| 2 | Entity EJB | JPA |
| 3 | Message driven EJB | Spring JMS |
| 4 | Batch | Spring batch |
| 5 | SOAP service | SOAP service + REST end point |
| 6 | JAVA POJO service | Spring boot with REST end points |
| 7 | .NET | .NET Core |
| 8 | Telerik ORM | Entity framework |
| 9 | Weblogic/WebSphere | Tomcat |
| 10 | Oracle/SQL Server/DB2 | Postgres |
| 11 | IBM MQ | Amazon MQ |

TABLE B

Exemplary code generation features

| S. No. | Features |
|---|---|
| 1 | API test automation |
| 2 | Junit and Nunit test cases (asserts are manual) |
| 3 | API Proxy (Zuul) |
| 4 | OAuth2 authentication |
| 5 | CI/CD framework |

The cloud re-platforming activities includes converting the source code from on-premise design patterns to cloud friendly design patterns EJBs to POJOs on Spring framework, upgrading underlying libraries used by the application to make it compatible with cloud containers or PaaS. JDK, Spring, Mybatis and others, de-coupling the back-end business logic into multiple services, re-platform heavy weight Weblogic or WebSphere integration application servers to Tomcat servers, developing unit test cases, API test automation, CI/CD pipeline and others. Further, application cloud re-platforming involves several repetitive steps like code analysis, code refactoring, library upgrades, compiling build scripts, deployment scripts, containerization scripts etc. This results in significant improvement in Time to Market which in turn can reduce the overall cost and ensure high quality re-platforming.

Figure 3:
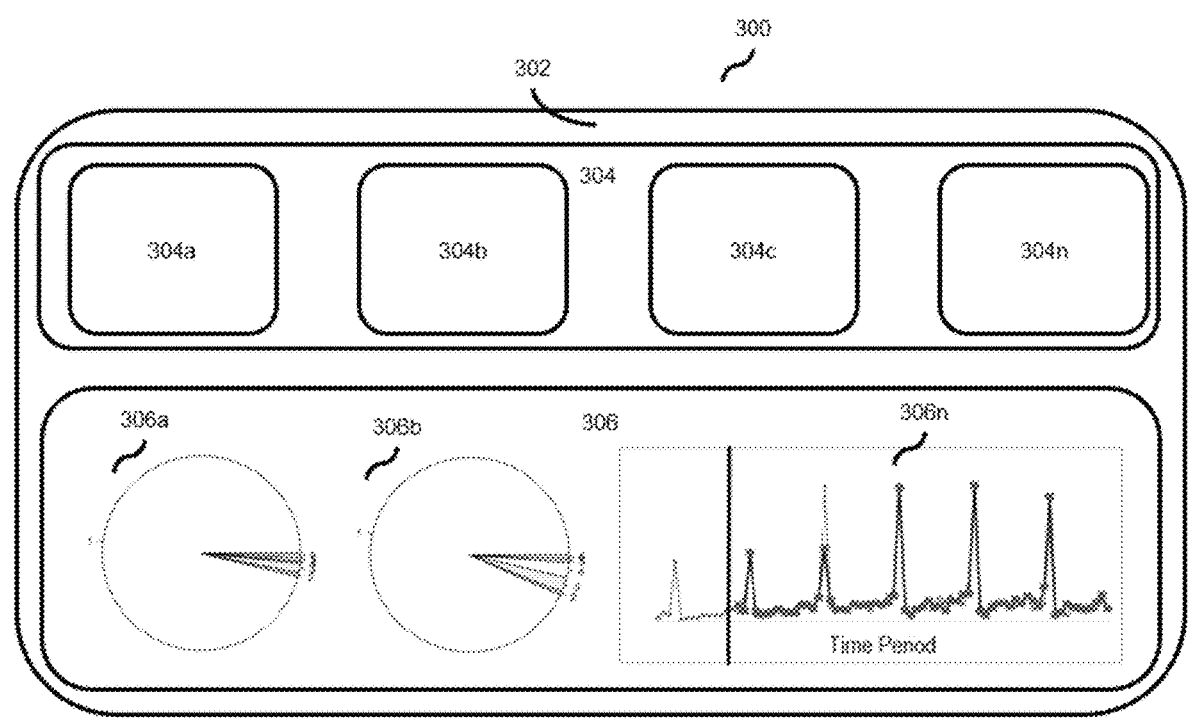
FIG. 3 illustrates an exemplary assessment report automatically generated by an exemplary integration application environment migration system, in accordance with an embodiment of the present subject matter.

FIG. 3 illustrates an exemplary assessment report 302 automatically generated by an exemplary integration application environment migration system, in accordance with an embodiment of the present subject matter.

In one embodiment, an assessment module 130 generates an assessment report 302 after assessing an integration application environment comprising code impediments, source code insights, and on-premise design patterns 214. The assessment report 302 provides automated insights into the time, effort and risk involved in re-platforming the integration application environment.

The assessment includes a code analysis, where it performs an automated assessment of the source application static code and identifies the inhibitors or blockers (Packages/Frameworks/API/Libraries etc.) which will fail the containerized cloud migration of the application and readiness parameters and thereby provides a detailed assessment report 302. The generation of the report is an automated process along with a few user configurations based on the integration application and target application environment.

The assessment report 302 gets an in-depth understanding of the quantum of changes that the source application will have to go through to assess the risk, cost, timeline and the impact to other dependent components and applications in form of readiness parameters 304 and a visual composition 306. The quantum of changes is summation of all changes required in the application migration. The assessment report has various sections, a few exemplary illustrations for an application snapshot includes parameters, such as a containerization readiness 304a, a re-platform readiness 304b, a DevOps Readiness 304c, a Macro/Micro API readiness 304n, a scheduler re-platform readiness 304n, a batch readiness, a message broker readiness, a DB re-platform readiness 304n, among others. Each of the parameters shows a readiness state in percentage (%) or the like to showcase how much ready and/or how much not-ready/blocking/inhibitor states are present for the respective parameter. For example, the containerization readiness 304a shows a container ready percentage with a readiness state and a refactoring required/inhibitor percentage, the re-platform readiness 304b shows a Tomcat ready percentage with a readiness state and a refactoring required/inhibitor percentage, the DevOps Readiness 304c shows a CD ready percentage with a readiness state and a CI readiness/inhibitor percentage, the Macro/Micro API readiness 304n shows a Macro API existing pointer with a readiness state and a Micro API existing/inhibitor state, the scheduler re-platform readiness 304n shows a re-platform readiness percentage with an AWS batch readiness state and an Azure Logic App ready/inhibitor percentage, and the DB re-platform readiness 304n shows a re-platform readiness percentage with a PostgresSQL readiness state and a refactoring required blocker/inhibitor percentage, and the like. One of the other section of the report is the visual composition 306, such as a database object spread [#Objects] 306a, a database object spread [#LoC] 306b, a platform composition by Number 306n, a platform composition by LoC 306n, and the like. In one example, the database object spread [#Objects] 306a depicts a spread or count or percentage of triggers, sequences, packages, procedures, views, materialised views, functions and tables, the database object spread [#LoC] 306b depicts a spread or count or percentage of triggers, sequences, packages, procedures, views, materialised views, functions and tables, the platform composition by Number 306n depicts a spread or count or percentage of JMS, XML configuration, Web services, Maven build, configuration, HTML, Servlet, Style sheet, reactJS, JSP, Junit, POJO, the platform composition by LoC 306n depicts a spread or count or percentage of JMS, XML configuration, Web services, Maven build, configuration, HTML, Servlet, Style sheet, reactJS, JSP, Junit, POJO, and the like.

Further in one example, various sections of the assessment report 302 provides following information sections, application snapshot consist of framework/libraries/packages used, application containerization readiness, integration application server re-platforming readiness to Tomcat or Kestrel integration application server, database server re-platforming readiness to PostgreSQL or alike, containerization readiness (to Docker/Kubernetes), CI/CD readiness (unit/functional/performance test case, build and continuous integration, automation available), macro and micro API candidates, API readiness (existing and potential API in the application).

The present method provides end to end transformational capabilities by assessing the integration application environment, followed by transforming them to cloud using cloud friendly design patterns and finally manages this entire journey by providing your stakeholders and decision makers with transparent visibility for quick decision making. All application dependencies starting from databases to batch programs, schedulers to message brokers will be holistically transformed to cloud. In the application analysis section of the assessment report 302 the method analyses the entire integration application to identify blockers in source code including design patterns that inhibit cloud migration. All dependencies are also analysed to provide a holistic view for design and planning purposes. It discovers and analyse application components inventory, technology stacks and their dependencies, identify Application's business, data Services and their API readiness, identify the Containerization and Cloud Re-platforming blockers & DevOps readiness and efforts for changes such as JAVA vX.X to JAVA v1.8; EJB (Session Bean/Entity Bean/MDB) to Spring Boot Service with Spring Framework (Pojo); .NET vX.X to .NET Core v2.2.

In database analysis section of the assessment report 302 the method analyses the database to analyse and discover database inventory, data objects details and database size, identify database re-platform readiness and blockers, identify the application blockers and dependencies for database re-platforming and efforts for changes such as Oracle/SQL Server/DB2/Sybase to Postgres/MySQL. In batch & scheduler analysis section of the assessment report 302 the method analyses the batch & scheduler, to analyse and discover batch program inventory and batch schedulers, identify batch scheduler re-platform readiness, blockers and dependencies, identify application batch services for batch re-platforming and efforts for changes such as Autosys/ControlM to AWS Batch (AWS Cloud)/Azure Logic App (Azure Cloud)/Quartz (Private Cloud). In message broker analysis section of the assessment report 302 the method analyses the message broker to analyse and discover message broker inventory and messaging objects, identify message broker re-platform readiness, blockers and dependencies, identify application blockers and dependencies for message broker re-platforming and efforts for changes such as TIBCO EMS/Rendezvous or WebLogic/WebSphere or Message Queue or Sonic Message Queue to Active MQ.

Figure 4:
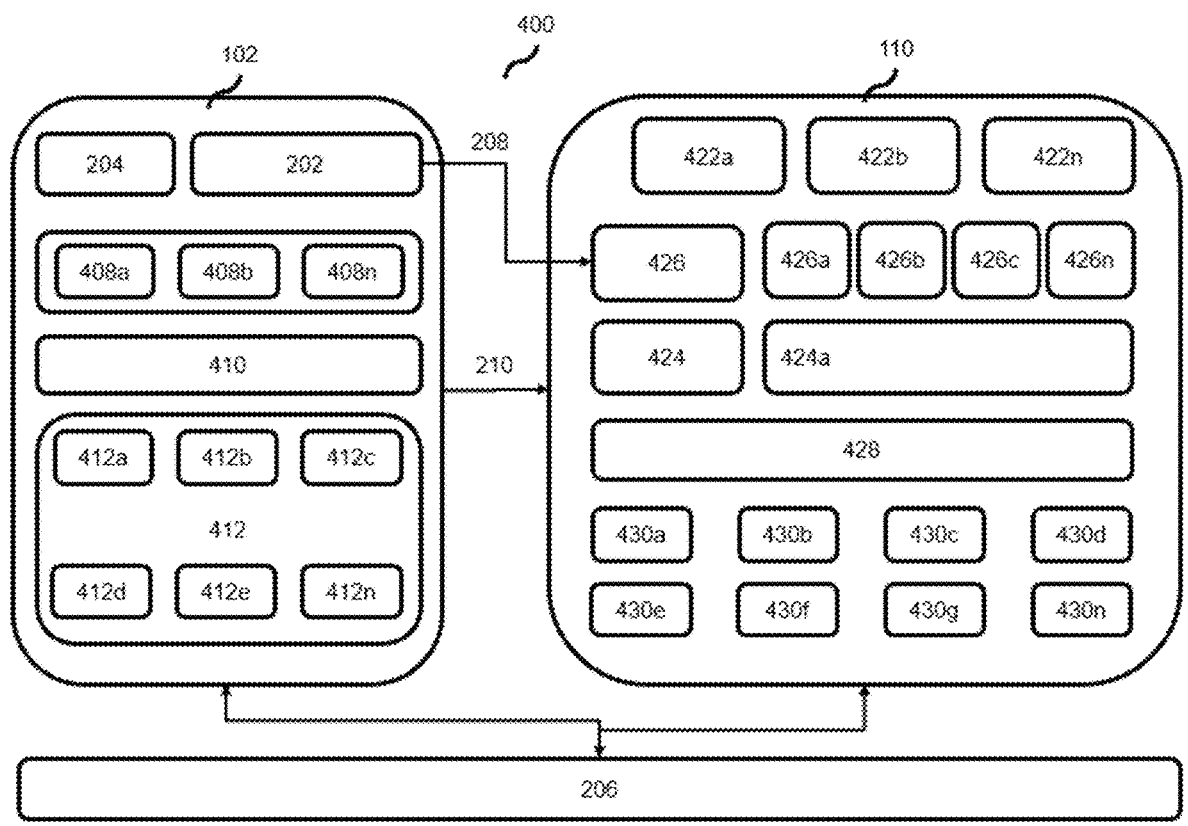
FIG. 4 depicts an exemplary view of an exemplary integration application environment migration method, in accordance with an embodiment of the present subject matter.

FIG. 4 depicts an exemplary view 400 of an exemplary application environment migration method, in accordance with an embodiment of the present subject matter.

In one embodiment, an application deployment view 400 with pre and post re-platforming is depicted using the method and system of an integration application environment migration to a target application environment, in accordance with an embodiment of the present subject matter. The one or more web applications is generally belonging to an integration application environment residing or accessible by a server 102 transforms or migrates to a modernised re-platformed application belonging to a target application environment residing or accessible by a cloud environment 110. Firstly, a code assessment 206 happens for the integration application environment migration to the target application environment. Assessment of the application determines a quantum of change required in code change to remove and change code inhibitors for containerization. The migration is performed with following steps, an integration application web server with integration applications as accessible by the server 102 is converted to web front instances 422a, 422b, . . . , 422n as the case may be. An integration application server (IIS cluster) (202) is further re-factored into an API management layer 426 with various App macro-service instances 426a, 426b, 426c, . . . 426n. The macro-service instances are based on the size and complexity of the integration application. In one implementation, a re-factor module 132 performs factoring and repackaging 208 of the macro services into the target application environment.

The source application database 204 is also re-factored a PaaS/CaaS cluster 424a of a target database 424. The web front instances 422a, 422b, . . . , 422n and the macro-service instances 426a, 426b, 426c, . . . 426n are further linked to components, including but not limited to a service mesh, an Azure Kubernetes Service (AKS) cluster, an App service, an Azure Container Instances (ACI), and the like of the cloud computing environment 110. In one implementation, a source Oracle database is migrated to a PostgresSQL database along with a container/orchestration platform of the cloud environment 110.

Virtual machine instances 408a, 408b, . . . , 408n of the integration application are migrated to the container cluster of the cloud environment 110. Thus, an on-premise data centre 410 of the integration application environment 410 having an on-premise ecosystem 412 is re-platformed 210/migrated to a private/public cloud 428 of the cloud environment 110. In one implementation, components 412a, 412b, 412c, 412d, 412e, . . . , 412n of the on-premise ecosystem 412, including but not limited to, an EBS, a caching, local files, rules engines, a message broker, a batch and scheduler, an authentication protocol, security platforms, and the like are re-platformed 210/migrated to private/public cloud 428 independent or standard services/target components 430a, 430b, 430c, 430d, 430e, 430f, 430g, . . . , 430n including but not limited to, Azure batch, Azure Logical App, AWS Batch service, Spring Batch, Azure queues, Event Hub, Service Bus, AppInsights, Redis Cache, Storage, Vnet, Azure AD, and the like.

In one implementation, the method modifies existing on-premise application to work efficiently on cloud using a container or PaaS, upgrades or changes all blockers related to source code and design patterns and all underlying libraries to make them compatible with container or PaaS, integration application servers and database may re-placed to reduce TCO, and one or more applications may be de-coupled into services to improve efficiency and velocity.

In one example, Table C may be used as an example to illustrate a re-platforming migration.

TABLE C

Exemplary As-Is State to To-Be State

| As-Is State | To-be State |
|---|---|
| JSF, Tiles, Servlets, Struts | JSF, Tiles, Servlets, Struts |
| (EJB) Session Bean | REST Client, Redis HttpSession Cache |
| (EJB) Entity Bean, Hibernate | Tomcat Server |
| | API Gateway |
| | REST API |
| | Spring Boot Macro Services |
| | (ORM) JPA, Hibernate |
| WebLogic App Server 12c | Tomcat Server 9 |
| Oracle Database 12c | PostgreSQL |
| Batch Jobs | Azure Batch Service |

Figure 5:
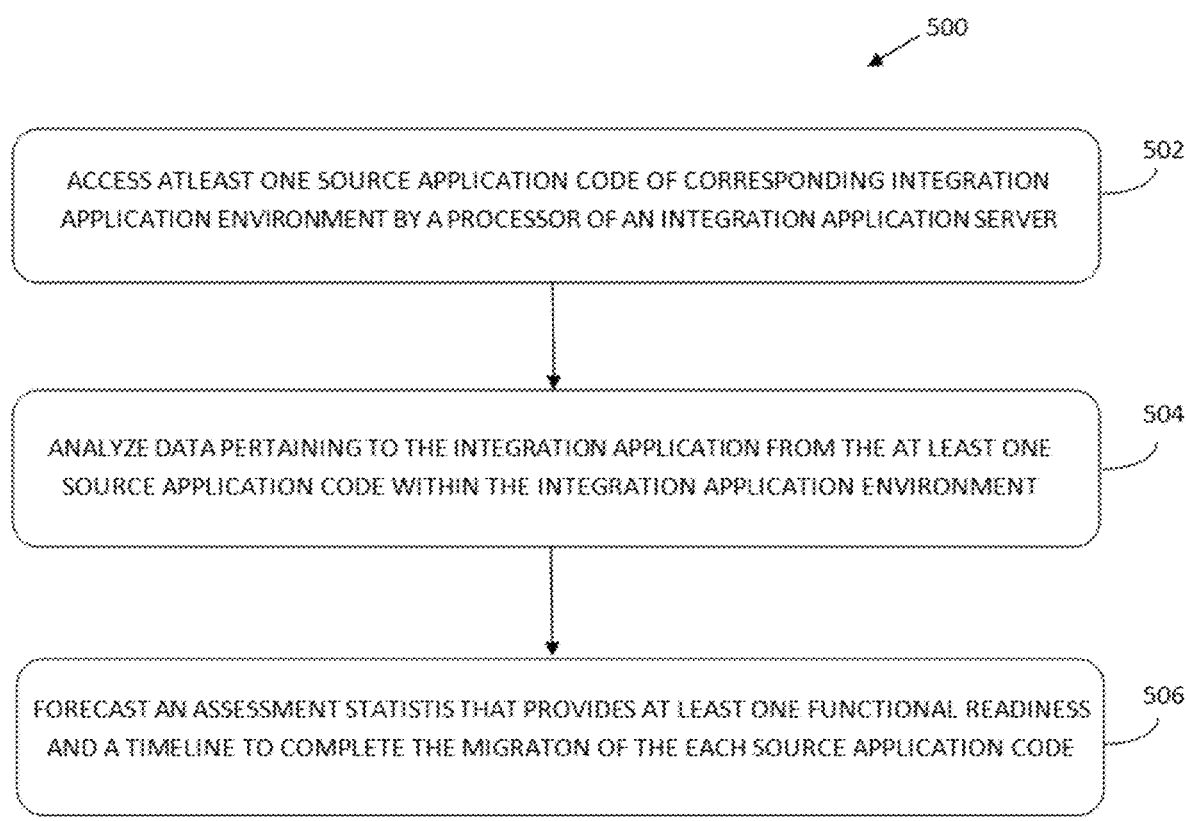
FIG. 5 illustrates an exemplary flowchart of a method of integration application environment migration, in accordance with an embodiment of the present subject matter.

In one implementation, as-is state is JSP based UI to session EJB calls with a few data services and the one or more web application with commercial integration application server, session persistence and stateful services as-is and migrated to-be state is decoupled web application with JSF WebFront and RESTful Spring Boot macro-services on containers (independent scaling) over API gateway FIG. 5 illustrates an exemplary flowchart 500 of a method of integration application environment migration, in accordance with an embodiment of the present subject matter.

In one implementation, a method 500 for integration application environment migration is shown. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices. The order in which the method is described and is not intended to be construed as a limitation, and any number of the described method blocks can be combined in any order to implement the method or alternate methods. Additionally, individual blocks may be deleted from the method without departing from the spirit and scope of the disclosure described herein. Furthermore, the method may be implemented in any suitable hardware, software, firmware, or combination thereof. However, for ease of explanation, in the embodiments described below, the method may be implemented in the above-described system.

At step/block 502, assess at least one source application code of an integration application environment by a processor 122 of a system 120 of an integration application server 102. In one implementation, the source application code may be assessed by an assessment module 130 of the system 120.

At step/block 504, analyses data pertaining to each integration application from the at least one source application code within the integration application environment. In one implementation, the data may be ascertained by the assessment module 130.

At step/block 506, forecast an assessment statistic that provides at least one functional readiness and a timeline to complete the migration of the each source application code. In one implementation, the assessment statistic may be forecasted by the assessment module 130.

Thus, the method 500 helps in application environment migration by providing the forecasted assessment statistic and a timeline for migration from an integration application environment to a target application environment.

Figure 6:
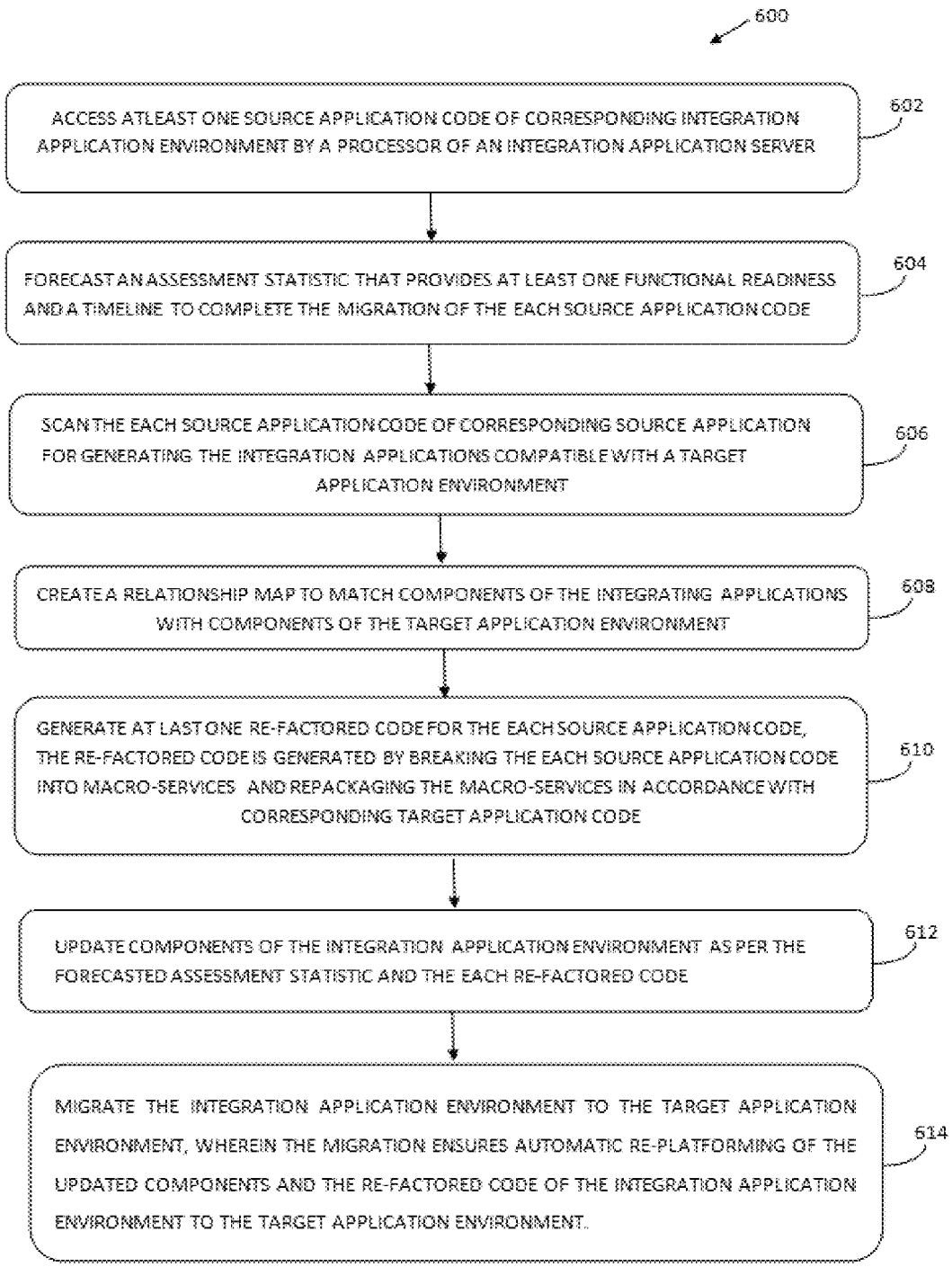
FIG. 6 illustrates another exemplary flowchart of a method of integration application environment migration, in accordance with an embodiment of the present subject matter.

FIG. 6 illustrates another exemplary flowchart of a method of application environment migration, in accordance with an embodiment of the present subject matter.

In one implementation, a method 500 for application environment migration is shown. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices. The order in which the method is described and is not intended to be construed as a limitation, and any number of the described method blocks can be combined in any order to implement the method or alternate methods. Additionally, individual blocks may be deleted from the method without departing from the spirit and scope of the disclosure described herein. Furthermore, the method may be implemented in any suitable hardware, software, firmware, or combination thereof. However, for ease of explanation, in the embodiments described below, the method may be implemented in the above-described system.

At step/block 602, assess at least one source application code of corresponding integration application environment by a processor 122 of a system 120 of an integration application server 102. In one implementation, the source application code may be assessed by an assessment module 130 of the system 120.

At step/block 604, analyses data pertaining to each integration application from the at least one source application code within the integration application environment. In one implementation, the data may be ascertained by the assessment module 130.

At step/block 606, forecast an assessment statistic that provides at least one functional readiness and a timeline to complete the migration of the source application code. In one implementation, the assessment statistic may be forecasted by the assessment module 130.

At step/block 608, scan the each source application code of corresponding source application for generating the integration applications compatible with a target application environment. In one implementation, the source application code may be scanned by a re-factor module 132.

At step/block 610, generate at last one re-factored code for the each source application code, wherein the re-factored code is generated by breaking the source application code into macro-services and repackaging the macro-services in accordance with corresponding target application code. In one implementation, the re-factored code may be generated by the re-factor module 132.

At step/block 612, update components of the each integration application environment as per the forecasted assessment statistic and the re-factored code. In one implementation, the components of the integration application environment may be updated by a re-platform module 134.

At step/block 614, migrating the integration application environment to the target application environment by re-platforming the updated components and the re-factored code of the integration application environment to the target application environment. In one implementation, the integration application environment may be automatically migrated to the target application environment by the re-platform module 134.

Thus, the method 600 helps in application environment migration by providing a forecasted assessment, re-factoring the code and re-platforming the application for migration from an integration application environment to a target application environment.

The present solution is used to re-platform complex applications to cloud and deploy them in production environments. A few examples are shown using the method and system of the integration application migration to a target application environment, in accordance with an embodiment of the present subject matter. The following shows preparation, planning and execution along with outcome of the studies. In one example, a cloud re-platforming of JAVA Batch App for a leading secondary mortgage firm, an integration application environment belongs to a leading secondary mortgage company providing mortgage-backed securities that is a multi-billion-dollar enterprise with operations in USA and is also a publicly traded firm. The primary business challenges are complex JAVA Batch application developed 10 years ago on Autosys & EJB on WebLogic MQ by using Message Driven Bean EJB (MDB) Pojo Services, JDBC etc., using IBM MQ message broker, batch jobs, alongside using Oracle database. This application is business-critical and handles key long-running processes. Non-availability of the key SME who developed this application posing challenges in cloud re-platforming. Using the present solution approach, the Oracle database was re-platformed to Postgres using the method steps, the Autosys Scheduler was re-platformed to Quartz and back-end EJB (MDB) were re-platformed to independent Spring JMS with Spring Boot/Batch Service Apps with REST end points. The message broker was re-platformed to Amazon MQ. Each service App were then deployed on separate containers on AWS ECS VPC providing infinite scalability, high availability, high fault tolerance and improved performance. Centralized JOB dependencies of Autosys were refactored to self-managed dependencies using App specific quartz scheduler resulting in reduced operational complexity. Among the top benefits, TCO reduction by over 50%, mainly due to the elimination of WebLogic & Autosys and also by containerization, increase in development productivity due to macro-services and CI/CD automation, total cost of implementation is reduced by over 50% using automation, implementation is to be completed in 6 weeks (the same would have taken 9 months if done manually).

In one another example, present solution is used for cloud re-platforming of .NET Web App for a leading us consulting firm, an integration application environment belongs to one of the largest professional services and accounting audits with content management firms with employees in over 700 offices in 150 countries around the world. The primary business challenges are complex .NET web application developed over the years using ASP .NET, C#, Telerik ORM alongside, Microsoft MQ, and using SQL Server database. This application is business critical handling the key B2C function for a leading Professional Service provider. This task became more complicated due to the non-availability of key SME who developed this application. Using the present solution approach, the source application is to be broken into Web front-end and Service Back-end. The back-end legacy .NET services with Telerik ORM is re-platformed to independent .NET Core Service Apps with entity framework with REST End Points. The web front and each service App is then deployed in Kestrel & NGINX on separate containers on Azure cloud providing infinite scalability, high availability, high fault tolerance and improved performance. The web front and macro services were made stateless with Redis cache. Message Broker re-platformed to RabbitMQ, Batch jobs to AWS Batch. The service REST API end points were secured with oAuth2. Automated Testing+CI/CD was enabled for Web-Front and All Macro Services. Among the top benefits, re-platform resulted TCO reduction of over 45% mainly due to elimination of IIS & Telerik ORM, total cost of implementation is reduced by over 45%, increased in development productivity due to macro services and CI/CD automation, completed in six weeks compared to 7 months if done manually.

Although implementations of system and method for integration application environment migration have been described in language specific to structural features and/or methods, it is to be understood that the appended claims are not necessarily limited to the specific features or methods described. Rather, the specific features and methods are disclosed as examples of implementations for integration application environment migration.

We claim:

1. A method for integration applications environment migration utilizing hub and spoke architecture, the method comprising:
   assessing, by a processor of an integration application server, at least one source application code of corresponding integration application environment;
   forecasting, by the processor, an assessment statistic, wherein the assessment statistic provides at least one functional readiness and a timeline to complete the migration of the each source application code;
   scanning, by the processor, the each source application code of corresponding source application for generating the integration applications compatible with a target application environment;
   creating, by the processor, a relationship map to match components of the integrating applications with components of the target application environment;
   generating, by the processor, at last one re-factored code for the each source application code, wherein the re-factored code is generated by breaking the each source application code into macro-services and repackaging the macro-services in accordance with corresponding target application code;
   updating, by the processor, components of the integration application environment as per the forecasted assessment statistic and the each re-factored code; and
   migrating, by the processor, the integration application environment to the target application environment,
   wherein the migration ensures automatic re-platforming of the updated components and the re-factored code of the integration application environment to the target application environment.

2. The method as claimed in claim 1, further comprising a quantum change for migrating each source application code to the corresponding target application code, wherein the quantum change is calculated on the basis of the size and complexity of the integration application environment.

3. The method as claimed in claim 1, wherein the at least one re-factored code is generated utilizing a continuous integration and deployment framework and an automated test framework.

4. The method as claimed in claim 1, wherein the assessment statistic provides at least one inhibitor to complete the migration of the each source application code.

5. The method as claimed in claim 1, wherein repackaging the macro-services in accordance with the target application code is completed while retaining links between components of the integration application environment.

6. The method as claimed in claim 1, wherein the macro-services are identified by an AI Engine.

7. The method as claimed in claim 1, further comprising: migrating, by the processor, deployment architecture, component configurations, structure of the integration applications from the integration application environment in accordance with the target application environment.

8. The method as claimed in claim 1, further comprising: implementing, by the processor, security rules from the integration application environment in accordance with the target application environment.

9. The method as claimed in claim 1, further comprising: packaging and building, by the processor, each service into a separate container by generating an application program interface proxy utilizing a gateway and a continuous integration and continuous deployment framework.

10. The method as claimed in claim 1, further comprising: accessing, by the processor, a plurality of storage units comprising a business logic, links, rule engines, libraries of available environments, standard tools, and coding languages.

11. A system for integration application environment migration using hub and spoke architecture, the system comprising:
a processor; and
a memory coupled to the processor, wherein the processor executes a plurality of modules stored in the memory, and wherein the plurality of modules comprising: an assessment module, for assessing at least one source application code of corresponding integration application environment and data pertaining to each integration application from the at least one source application code within the integration application environment, wherein the assessment module forecasts an assessment statistic, wherein the assessment statistic provides at least one functional readiness and a timeline to complete the migration of the each source application code;
a re-factor module, for scanning the each source application code of corresponding source applications for generating the integration applications compatible with a target application environment and generating at last one re-factored code for the each source application code, wherein the re-factored code is generated by breaking the each source application code into macro-services and repackaging the macro-services in accordance with corresponding target application code; and
a re-platform module, for updating components of the integration application environment as per the forecasted assessment statistic and the each re-factored code and migrating the each source application environment to the target application environment, wherein the migration re-platforms the updated components and the re-factored code of the integration application environment to the target application environment.

12. The system as claimed in claim 11, further comprising a quantum change for migrating each source application code to the corresponding target application code, wherein the quantum change is calculated on the basis of the size and complexity of the integration application environment.

13. The system as claimed in claim 11, wherein the assessment statistic provides at least one inhibitor to complete the migration of the each source application code.

14. The system as claimed in claim 11, wherein repackaging the macro-services in accordance with the target application code is completed while retaining links between components of the integration application environment.

15. The system as claimed in claim 11, wherein the macro-services are identified by an AI Engine.

16. The system as claimed in claim 11, wherein the re-factor module further comprising: migrating, by the processor, deployment architecture, component configurations, structure of the integration application from the integration application environment in accordance with the target application environment.

17. The system as claimed in claim 11, wherein the re-platform module further comprising: implementing, by the processor, security rules from the integration application environment in accordance with the target application environment.

18. The system as claimed in claim 11, wherein the re-factor module further comprising: packaging and building, by the processor, each service into a separate container by generating an application program interface proxy utilizing a gateway and a continuous integration and continuous deployment framework.

19. The system as claimed in claim 11, wherein the plurality of modules further executes accessing, by the processor, a plurality of storage units comprising a business logic, links, rule engines, libraries of available environments, standard tools, and coding languages.

20. The system as claimed in claim 11, wherein the integration application environment migrates to the target application environment comprising the steps of: an integration source to target environment re-development, an integration source to target application re-factoring, an integration source to target application re-hosting, and an integration source to target application re-platforming.

* * * * *